US012385462B2

(12) United States Patent
Reilly-Collins et al.

(10) Patent No.: US 12,385,462 B2
(45) Date of Patent: Aug. 12, 2025

(54) HYDROELECTRIC TURBINE

(71) Applicant: THE FISH FRIENDLY HYDROPOWER COMPANY LIMITED, Stockport (GB)

(72) Inventors: Henry Reilly-Collins, Manchester (GB); Richard Tate, Manchester (GB); James Jones, Shrewsbury (GB); Jack Dunkley, Stone (GB)

(73) Assignee: THE FISH FRIENDLY HYDROPOWER COMPANY LIMITED, Stockport (GB)

( * ) Notice: Subject to any disclaimer, the term of this patent is extended or adjusted under 35 U.S.C. 154(b) by 0 days.

(21) Appl. No.: 18/580,844

(22) PCT Filed: Jul. 20, 2022

(86) PCT No.: PCT/GB2022/051881

§ 371 (c)(1),
(2) Date: Jan. 19, 2024

(87) PCT Pub. No.: WO2023/002185

PCT Pub. Date: Jan. 26, 2023

(65) Prior Publication Data

US 2025/0092853 A1 Mar. 20, 2025

(30) Foreign Application Priority Data

Jul. 22, 2021 (GB) ...................................... 2110578

(51) Int. Cl.
*F03B 17/06* (2006.01)
*F03B 13/10* (2006.01)

(52) U.S. Cl.
CPC ............ *F03B 17/063* (2013.01); *F03B 13/10* (2013.01); *F05B 2240/93* (2013.01); *F05B 2250/25* (2013.01)

(58) Field of Classification Search
CPC ........ F03B 13/10; F03B 17/06; F03B 17/063; F03D 3/00; F03D 3/002; F03D 3/005
See application file for complete search history.

(56) References Cited

U.S. PATENT DOCUMENTS 658,969 A * 10/1900 Walter .................. F03B 17/061 416/197 A
953,891 A * 4/1910 Atkins .................... F03B 17/06 416/11

(Continued)

FOREIGN PATENT DOCUMENTS

| | | | |
|---|---|---|---|
| CA | 2782764 | A1 | 1/2014 |
| CN | 107676212 | A | 2/2018 |
| FR | 2457989 | A1 | 12/1980 |

OTHER PUBLICATIONS

International Search Report and Written Opinion, International Application No. PCT/GB2022/051881, mailed Oct. 24, 2022.

*Primary Examiner* — Christopher R Legendre
(74) *Attorney, Agent, or Firm* — MARSHALL, GERSTEIN & BORUN LLP

(57) ABSTRACT

A floating turbine system comprising a turbine comprising a central cylinder comprising a curved cylindrical surface, a first end face and a second end face opposite the first end face, wherein the first end face and the second end face are joined by a the curved cylindrical surface, and wherein the central cylinder has a sealed inner cavity; a plurality of helical vanes disposed on outer side of the curved cylindrical surface; wherein channels are formed between each of the plurality of helical vanes; and wherein the channels are configured to allow fish to pass along the channels.

14 Claims, 8 Drawing Sheets

(56) References Cited

U.S. PATENT DOCUMENTS

| | | | | |
|---|---|---|---|---|
| 2013/0328311 | A1 | 12/2013 | Tanabe | |
| 2014/0017065 | A1 | 1/2014 | Dale et al. | |
| 2025/0092853 | A1* | 3/2025 | Reilly-Collins | F03B 17/063 |

* cited by examiner

6” Salmonid Relative to Turbine

12” Salmonid Relative to Turbine

24” Salmonid Relative to Turbine

HYDROELECTRIC TURBINE

FIELD OF THE INVENTION

The present invention relates generally to a floating turbine for use in a waterway for the generation of hydroelectric energy, and a method of manufacturing the same. In addition, the present invention relates to a method of installing a floating hydroelectric turbine.

BACKGROUND

A water turbine is a mechanical device for transforming the energy in running water into mechanical energy. Water turbines typically comprise blades or vanes which are arranged around a cylinder which has a central shaft. In use, water turbines are placed in waterway, such as river, and are orientated so that the edges of the blades face the direction of the water flow. When flowing water hits the vanes, a force will be created on the vanes which causes the turbine to turn. The rotational energy of the turbine can be harnessed as electrical energy by connecting an electrical generator to the shaft of the water turbine.

Water wheels, which are water turbines with flat paddles, have been used since antiquity. Modern water turbines have vanes that had their shapes optimized to, for example, have a curved or helical structure in order to provide a maximum power output for a given water flow and a given head of water.

When water turbines are installed in waterways, they are typically accompanied by substantial civil engineering works that can span the waterway and the surrounding land. These often permanent works are expensive to install and also obstruct waterways, which is harmful to wildlife. More self-contained systems have been developed which involve tethering the turbine to a floating device such as a pontoon. However, these floating devices are typically large and therefore can also result in the obstruction of water ways.

Water turbines are also harmful to the fish that reside in the waterways. Water wheels tend to be considered fish-unfriendly due to the aggressive nature with which the vanes of the turbine can strike the fish. In addition, there are multiple pinch points across conventional turbines in which fish can be caught, and there are also areas in the turbines that can act as fish traps.

There is therefore a need to provide a water turbine which can be installed in a waterway with minimum additional parts that is friendly to fish, and can provide a large power output.

A floating water wheel is disclosed in GB2443697. The floating water wheel is made from a buoyant material such as expanded polystyrene. No assistance from floats or buoyancy devices is needed for the water wheel to float. The floating water wheel has flat horizontal paddles.

SUMMARY OF INVENTION

When viewed from a first aspect the invention provides a floating turbine system comprising a turbine comprising a central cylinder. The central cylinder comprises a curved cylindrical surface, first end face and a second end face opposite the first end face, wherein the first end face and the second end face are joined by the curved cylindrical surface. The central cylinder has a sealed inner cavity. A plurality of helical vanes are disposed on outer side of the curved cylindrical surface. Channels are formed between each of the plurality of helical vanes. The channels are configured to allow fish to pass along the channels.

The present invention provides a turbine which floats due to the light mass of the turbine owing the central cylinder of the turbine having a closed inner cavity. The benefits of a floating turbine is that the turbine can evade debris that may be in the waterway.

The vanes of the turbine are arranged such that channels are provided between each of the vanes that allow fish to pass through the channels. Fish can therefore safely transit the turbine without being caught in it.

In addition to one or more of the features described above, or as an alternative to any of the foregoing embodiments, each of the plurality of helical vanes can have symmetrically opposing left- and right-hand augers, wherein the line of symmetry runs along the circumference of the cylinder at the midpoint between the first end and the second end of the central cylinder.

The provision of symmetrical left- and right-augers gives the turbine axial force equalization when in the water. Further benefits are that thrust force is eliminated. Water friction will be increased on the front face of the turbine, and water friction will be reduced on the rear face of the turbine, which enables the turbine to generate more power. In addition, angled vanes will strike fish with a reduced force compared to horizontal vanes, and therefore these vanes are more fish friendly than turbines with horizontal vanes.

In addition to one or more of the features described above, or as an alternative to any of the foregoing embodiments, a hollow disk can be provided around the circumference of the cylinder at the midpoint between the first end and the second end of the central cylinder. The hollow disk has an inner radius r equal to the radius of the curved cylindrical surface. The hollow disk has an outer radius R equal to r plus the radial extension of one of the plurality of helical vanes.

The provision hollow disk prevents fish being caught in the central point of the vanes where the left- and right-augers meet.

In addition to one or more of the features described above, or as an alternative to any of the foregoing embodiments, the plurality of helical vanes have a helix angle between 20 and 50 degrees.

The above described ranges of helix angles result in a reduction in the strike force received by fish when being hit by the blades. This range of helix angle therefore reduces the harm to fish in the water way. In addition, the above described ranges of helix angles provide for maximal power generation by the turbine. The static turbine torque, which relates to power generation, is maximized when the helix angles are within this range.

In addition to one or more of the features described above, or as an alternative to any of the foregoing embodiments, the plurality of helical vanes have a rake angle between 10 and 35 degrees.

A rake angle between 10 and 35 degrees, in combination with a helix angle between 20 and 50, results in the blades having a combined resolved helix and rake angle that produces a reduced strike force on a fish. The combination of the above described helix and rake angles result in harm reduction to fish in the waterways.

In addition to one or more of the features described above, or as an alternative to any of the foregoing embodiments, the plurality of helical vanes have rounded leading edges.

By rounding the leading edges of the vanes, the impact of the vanes when hitting fish will be reduced.

In addition to one or more of the features described above, or as an alternative to any of the foregoing embodiments, the radial extension of the first end face and the radial extension of the second end face of the central cylinder is greater than the radius of the curved cylindrical surface.

Gaps are provided in the outer circumference of the first end face and the outer circumference of the second end face, wherein the gaps, in use, allow fish in the channels to exit through the gaps.

The provision of gaps at the end faces of the turbine allows for fish that are located within the channels of the turbine to safely exit the channels through the gaps.

In addition to one or more of the features described above, or as an alternative to any of the foregoing embodiments, wherein the turbine has between four and eight helical vanes.

A number of vanes between four and eight presents a suitable number of vanes to provide for sufficiently sized channels between the vanes so that fish can swim along the channels, as well as providing for a sufficient number of vanes to provide a suitable power output.

In addition to one or more of the features described above, or as an alternative to any of the foregoing embodiments, wherein the turbine has six helical vanes.

The provision of six helical vanes represents a compromise between maximizing the power output of the turbine (since increasing the number of vanes increases the area swept by the turbine as well as decreases the percentage of swept area being lost by the turbine) and not adding too much mass to the turbine. Since generator and gearbox components can add substantially to the weight of the turbine, it is ideal to keep the weight of the other parts of the turbine as low as possible so that the turbine can float in water.

In addition to one or more of the features described above, or as an alternative to any of the foregoing embodiments, the turbine is formed from high-density polyethylene, HDPE.

HDPE is a flexible and pliable material suitable for withstanding the forces that the turbine will be subjected to in the waterway.

In addition to one or more of the features described above, or as an alternative to any of the foregoing embodiments, the turbine can further comprise a transmission shaft, a gearbox and a generator provided within the closed inner cavity; wherein the a gearbox is connected to the transmission shaft; and wherein the generator is connected to the gearbox. In some embodiments, the turbine has a density between 400 and 1000 kg/m$^3$. In some embodiments, the turbine has a density such that, in use, around ¼ to ¾ of the volume of the turbine will submerge in water. In one embodiment, the turbine has a density between 700 and 800 kg/m$^3$.

By providing a gearbox and a generator within the turbine, the rotational energy of the turbine can be converted into electrical energy. Since the rate of the rotation of the turbine will typically be low in a waterway, a gearbox is needed to step up the rate of the rotation so that it is suitable for a generator. A result of providing a gearbox and generator within the turbine is that is adds to the weight of the turbine. The degree of submergence of the hydroelectric turbine in that water is dependent on the combined weight of the central cylinder and shaft and the number and size of the vanes, as well as the weight of the gearbox and generator within the closed cavity of the central cylinder and any further joining components. The overall density of the turbine is such that ¼ to ¾ of the volume of the turbine will be submerged in water. The benefits of this level of submersion is that the power generation of the turbine is increased. It has been found that power generation of the turbine is maximized as the shaft of the turbine approaches the water level.

In addition to one or more of the features described above, or as an alternative to any of the foregoing embodiments, a torque reaction float can be rotatably connected to the first end face and the second end face.

The torque reaction float stabilizes the turbine in the water. When the turbine rotates, the torque reaction float will become partially submerged in the water as a reaction to this. The benefit of this is that the turbine can be stabilized in the water without the need for additional components such as a pontoon, which can be bulky. The system is therefore self-contained and is easy to transport and install.

When viewed from a second aspect the invention provides a method of manufacture of a floating hydroelectric turbine comprising: forming a central cylinder by polymer fabrication, wherein the central cylinder comprises a curved cylindrical surface, a first end face and a second end face opposite the first end face, wherein the first end face and the second end face are joined by the curved cylindrical surface, and wherein the central cylinder has an inner cavity. The method further comprises forming a plurality of helical vanes by polymer fabrication and welding the plurality of helical vanes to the outer side of the curved cylindrical surface. Channels are formed between each of the plurality of helical vanes which allow fish to pass along the channels. The method can further comprise providing a shaft, gearbox, generator and electrical components into the inner cavity of the central cylinder; and sealing the inner cavity.

DETAILED DESCRIPTION

Figure 1:
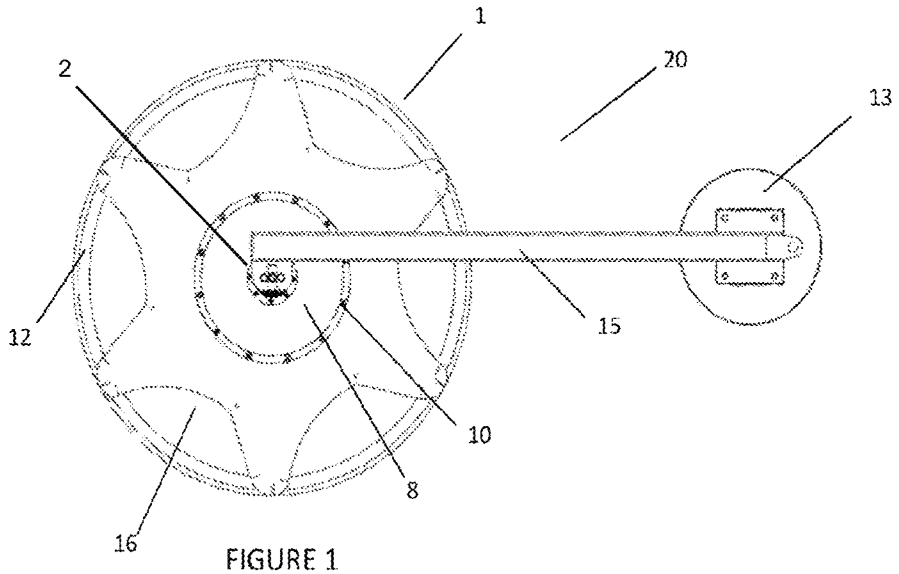
FIG. 1 shows a side perspective view of a floating hydroelectric turbine system in accordance with an embodiment of the present invention.
Figure 2:
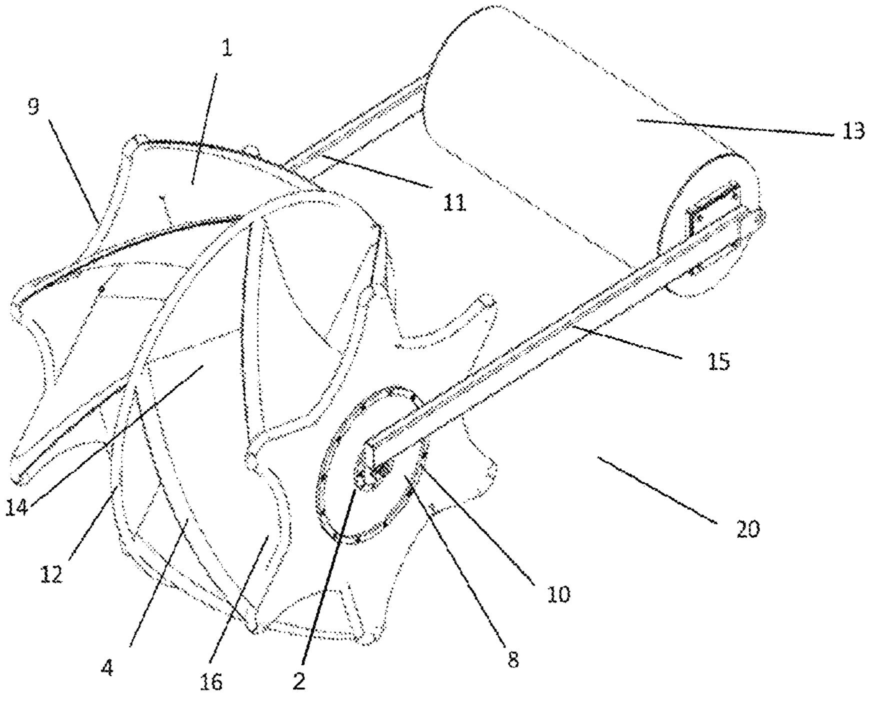
FIG. 2 shows another perspective view of a floating hydroelectric turbine system in accordance with an embodiment of the present invention.
Figure 3:
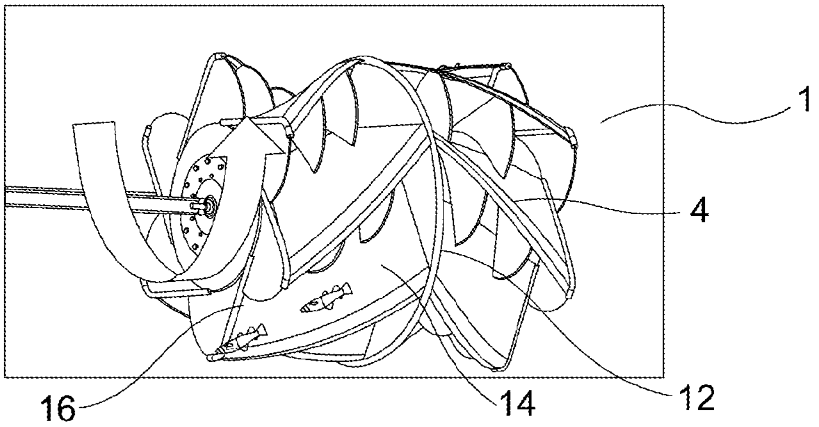
FIG. 3 shows fish passing along the turbine in accordance with an embodiment of the present invention.
Figure 3:
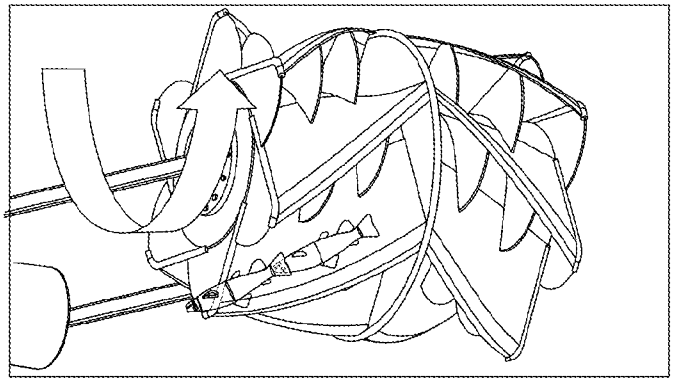
Figure 3:
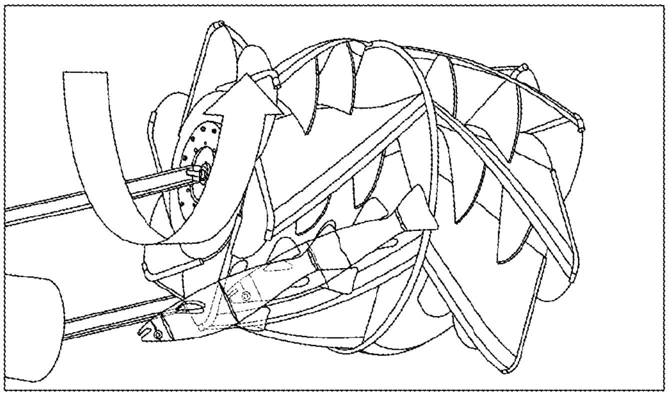
Figure 4:
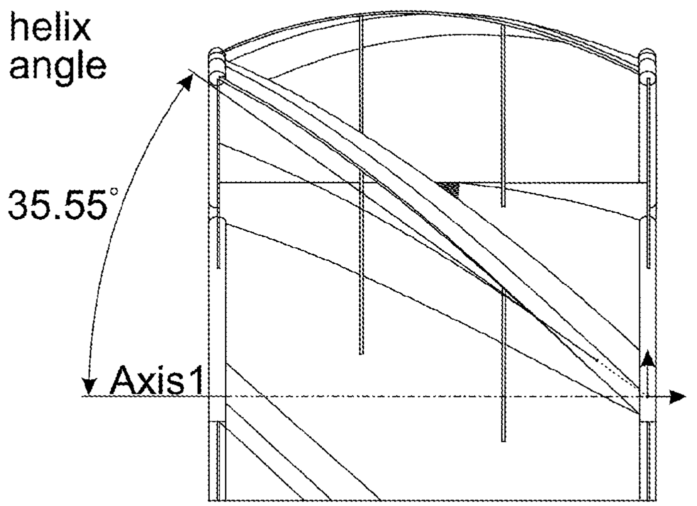
FIG. 4 shows the helix angle of the vanes of the turbine in accordance with an embodiment of the present invention.

FIGS. 1, 2 and 3 show a floating hydroelectric turbine system 20 according to an embodiment of the present invention. The system 20 includes turbine 1 connected to a torque reaction float 13.

The turbine 1 comprises a central cylinder 2 and a plurality of helical vanes 4. The central cylinder 2 comprises a first end face 8 and a second end face 9 opposite the first end face 8. The central cylinder 2 further comprises a curved cylindrical surface 10 which joins the first end face 8 to the second end face 9. A sealed cavity 3 is formed within the central cylinder 2.

The plurality of helical vanes 4 are disposed on the outer surface of the curved cylindrical surface 10 of the central cylinder 2. The spaces between each of the plurality of helical vanes 4 create channels 14 on the curved cylindrical surface 10. As shown in FIG. 3, the channels 14 are wide enough to enable fish to pass along the channels 14 and swim out of the channels 14 to safety. In one embodiment, the channels 14 are configured so that they are wide enough to allow up to a 61 cm salmon, or other type of fish, to pass along the channels 14.

Each of the plurality of helical vanes 4 have opposing left- and right-hand angled auger shaped vanes. This provides for axial force equalization. Each of the vanes 4 have the same radial extension. Each of the vanes 4 are symmetrically shaped and the line of symmetry runs along the circumference of the curved cylindrical surface 10 at the midpoint between the first end face 8 and the second end face 9. Put another way, the plurality of helical vanes 4 are chevron shaped or V-shaped, with the outer of the edges of the "V" aligned with the first end face 8 and the second end face 9 of the cylinder, and with the tip of the "V" positioned at the midpoint between the first end face 8 and the second end face 9 of the cylinder 2.

A hollow disk 12 can be provided on the curved cylindrical surface 10 of the cylinder 2 at the midpoint between the first end face 8 and the second end face 9 of the cylinder 2. The hollow disk 12 protrudes radially from the curved cylindrical surface 10. The hollow disk 12 may have an inner radius requal to the radius of the curved cylindrical surface, and an outer radius R equal to r plus the radial extension of one of the plurality of helical vanes 4. The provision of the disk 12 protects fish that could otherwise get trapped at the central "V" shape of the vanes 4 at the center of the turbine 1.

Turning to FIGS. 4 to 8, the configuration of the helical vanes 4 have been optimized to satisfy two criteria. The first criterion is to reduce the strike force that a fish would receive when being struck by the vanes 4. The second criterion is to maximize the power output that can be generated by the turbine 1.

The helix shaped profile of the vanes 4 can be characterized by an axial angle and a rake angle. The axial angle, which is also known as the helix angle, is the angle between the helical vane and the longitudinal axis of the central cylinder 2 that runs between the first end face 8 and the second end face 9 of the cylinder 2. In the example shown in FIG. 4, the helix angle is 35.55 degrees. In one embodiment, the helix angle is between 20 and 50 degrees.

Figure 5:
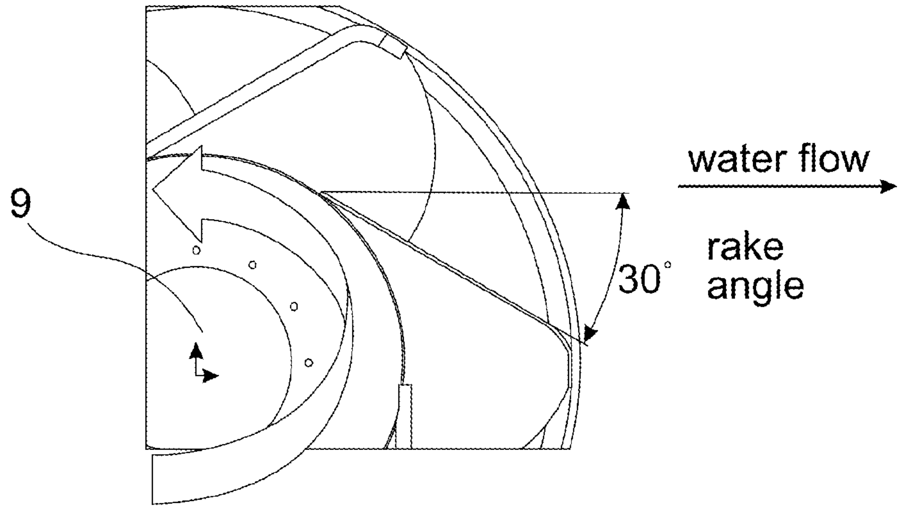
FIG. 5 shows the rake angle of the vanes of the turbine in accordance with an embodiment of the present invention.

FIG. 5 shows the perspective of looking at the turbine along the longitudinal axis of the shaft 5 from either the first end face 8 or the second end face 9. The rake angle is shown, which can be defined as the maximum angle formed between a radial line projected to the end of the vane from the center of the cylinder, and the line of the vane itself. In the example shown in FIG. 5 the rake angle is 30 degrees. In one embodiment, the rake angle is between 10 and 35 degrees. In one embodiment, the rake angle is 18 degrees.

Figure 6:
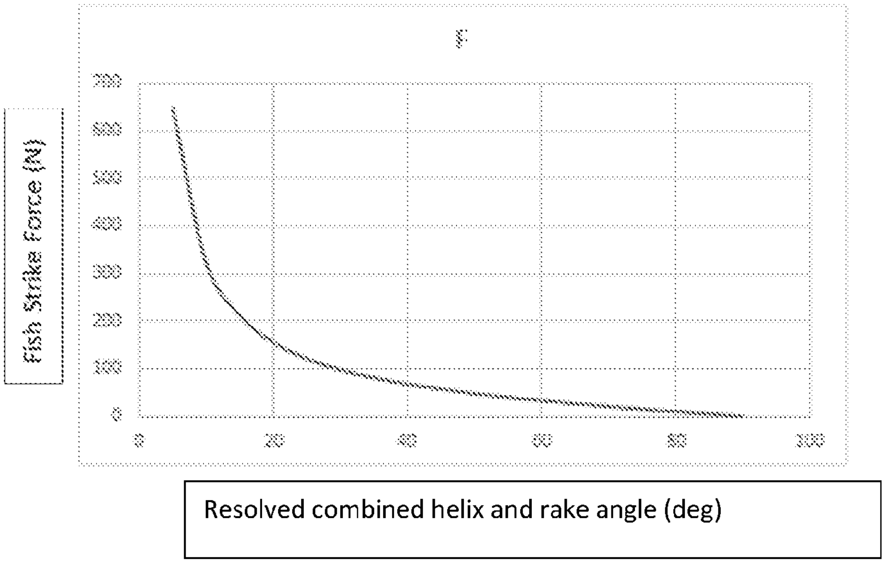
FIG. 6 shows the strike force received by a fish from the blades of the turbine, as a function of the resolved combined helix and rake angle.

FIG. 6 shows how changing the helix angle and rake angle of the vanes 4 can affect the resultant strike force that a fish would receive when being struck by the vanes 4. The strike force is plotted as a function of the resolved combined helix and rake angle, which is the angle created by the resolved combination of the helix angle and the rake angle. As can be seen, a steeper resolved combined helix and rake angle results in a reduction in the strike force that the fish receives. In order to produce FIG. 6, it has been assumed that the vanes 4 are travelling at the same velocity as the flow of water. It is also assumed that the vanes 4 strike a stationary fish that is positioned within the swept profile of the vanes. It is further assumed that there is no friction between the fish and the vane.

Figure 7:
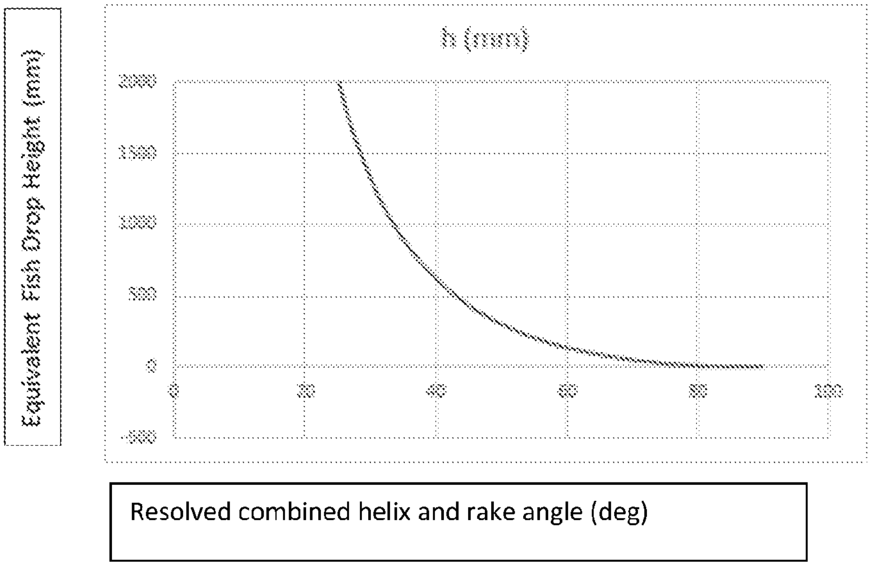
FIG. 7 shows an equivalent drop height experienced by the fish, for a given strike force, as a function of the resolved combined helix and rake angle.

In order to determine an upper strike force limit that can be considered safe for a fish, an equivalent fish drop height, which is the elevation a fish would have to be dropped from in order to receive a given strike force, has been calculated and is shown in FIG. 7. The additional parameters used are a fish body spring constant of 1500 N/m and a fish body damping constant of 10 Ns/m. A fish drop height of 650 mm is considered to be a maximum safe drop height, which corresponds to a maximum strike force of 70 N. A fish drop height of 650 mm corresponds to a resolved combined helix and rake angle of 40 degrees.

A helix angle between 20 and 50 degrees and a rake angle between 10 and 35 degrees will result in a resolved combined helix and rake angle of around 40 degrees, between 20 and 60 degrees. Although a water flow velocity of 4 m/s was used in the calculations, a typical waterway will have a velocity of 2 m/s or slower, and therefore the actual strike force received by the fish for a resolved combined helix and rake angle of 40 degrees will be even lower than that as shown in FIG. 6. Therefore, in practice, the impact on fish by the turbine 1 will be even safer than predicted.

Figure 8:
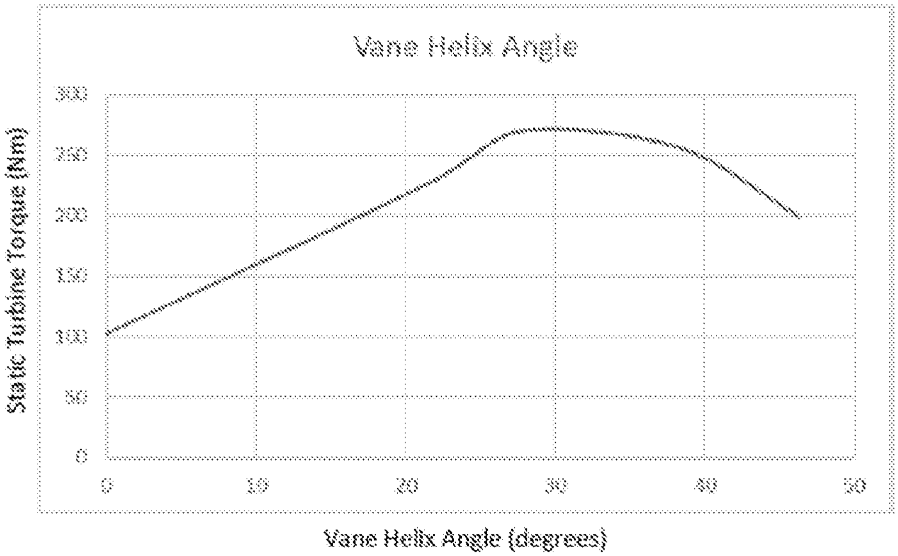
FIG. 8 shows the static turbine torque generated by the turbine as a function of the vane helix angle.

As well as a helix angle between 20 and 50 degrees being fish friendly, a helix angle between 20 and 50 degrees also maximizes the amount of power that can be generated by the turbine 1. FIG. 8 shows the results of computational fluid dynamics simulations of the turbine 1 in a waterway. The static turbine torque is plotted as a function of the vane helix angle. As can be seen in FIG. 8, a vane helix angle between 20 and 50 degrees results in the maximum static turbine torque. Static turbine torque can be considered to be proportional to the power output of the turbine 1.

Returning to FIGS. 1 to 3, the turbine 1 comprises further features that enable fish to pass the turbine 1 safely. The leading edges of the vanes 4 can comprise rounded leading edges. It is also envisaged that all edges of the turbine 1 can include rounded rubber edges. In one embodiment, the rubber leading edges have a 20 mm diameter.

As shown in FIGS. 1 to 3, the vanes 4 may further be configured such that first end face 8 and the second end face 9 of the turbine 1 are shaped to provide gaps 16 which allow fish in the channels provided by the vanes 4 to exit the channels 14 through the gaps 16. In this embodiment, the maximum radial extension of the first end face 8 and the maximum radial extension of the second end face 9 is greater than the radius of the curved cylindrical surface 10. The gaps 16 are provided in the outer circumference of the first end face 8 and the second end face 9 and are aligned with the channels 14. In other words, the first end face 8 and the second end face 9 of the turbine are shaped like a rounded star shape, wherein the "tips" of the star are aligned with the leading edges of the vanes 4.

Figure 9:
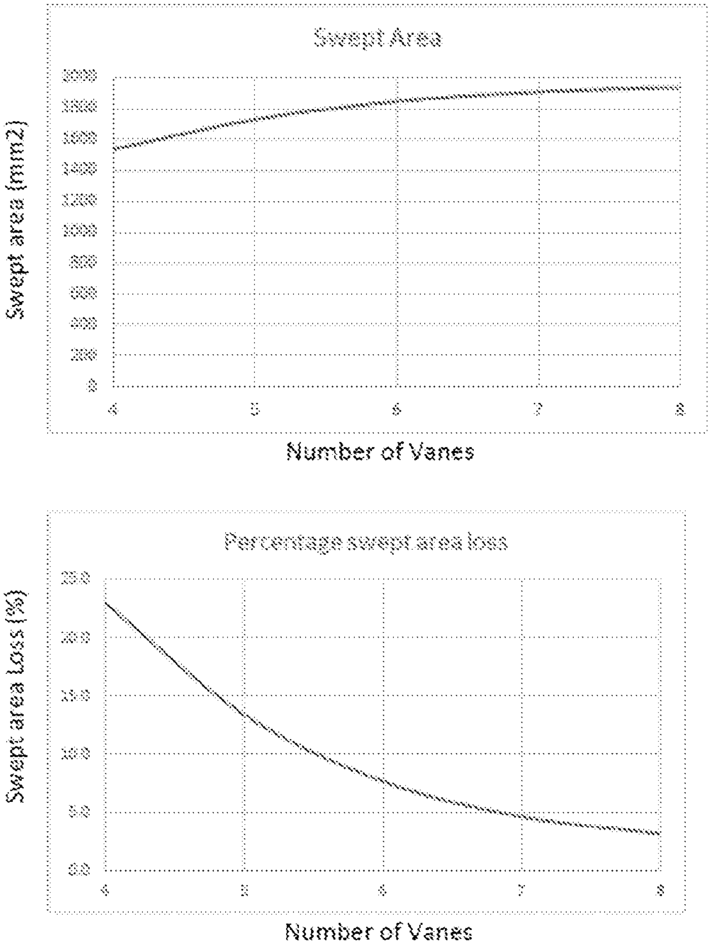
FIG. 9 shows the total swept area and the total swept area loss as a function of the number of vanes.
Figure 10:
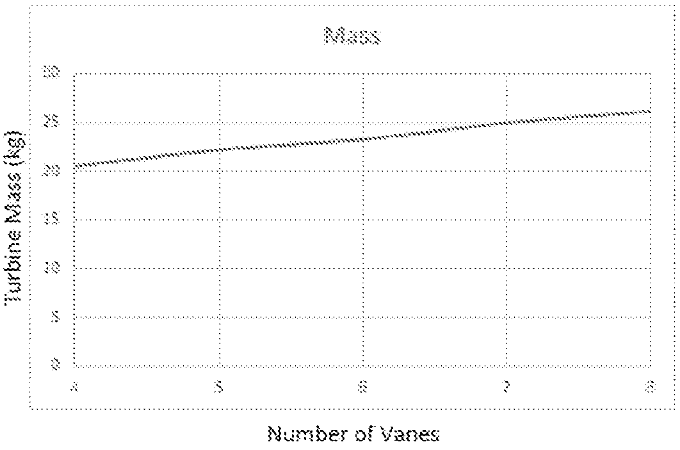
FIG. 10 shows the mass of the turbine as a function of the number of vanes.

The turbine 1 can have any number of vanes 4. In one embodiment, the turbine 1 can have between four and eight vanes 4. In another embodiment, the turbine 1 has six vanes. An advantage of having a greater number of vanes 4 is that more power can be generated by the turbine 1. As shown in FIG. 9, as the number of the vanes increases, the total area swept by the vanes, and thus the power generated by the turbine 1, increases. However, as shown in FIG. 10, a greater number of vanes also results in the turbine 1 having more mass. Keeping the mass of the turbine 1 low is important from a transport and installation perspective. In addition, since the generator 7 and gearbox 6 already contribute significantly to the mass of the turbine 1 (they can weigh around 45 kg combined), it is beneficial to keep the mass of the vanes 4 low so that the turbine 1 will only partially submerge in water. Therefore, six vanes presents an optimum between maximizing the area swept by the vanes and keeping mass of the turbine 1 reduced.

The central cylinder 2 and the helical vanes 4 and the shaft 5 can be welded together. The welded components can be made of high-density polyethylene, HDPE.

Figure 11:
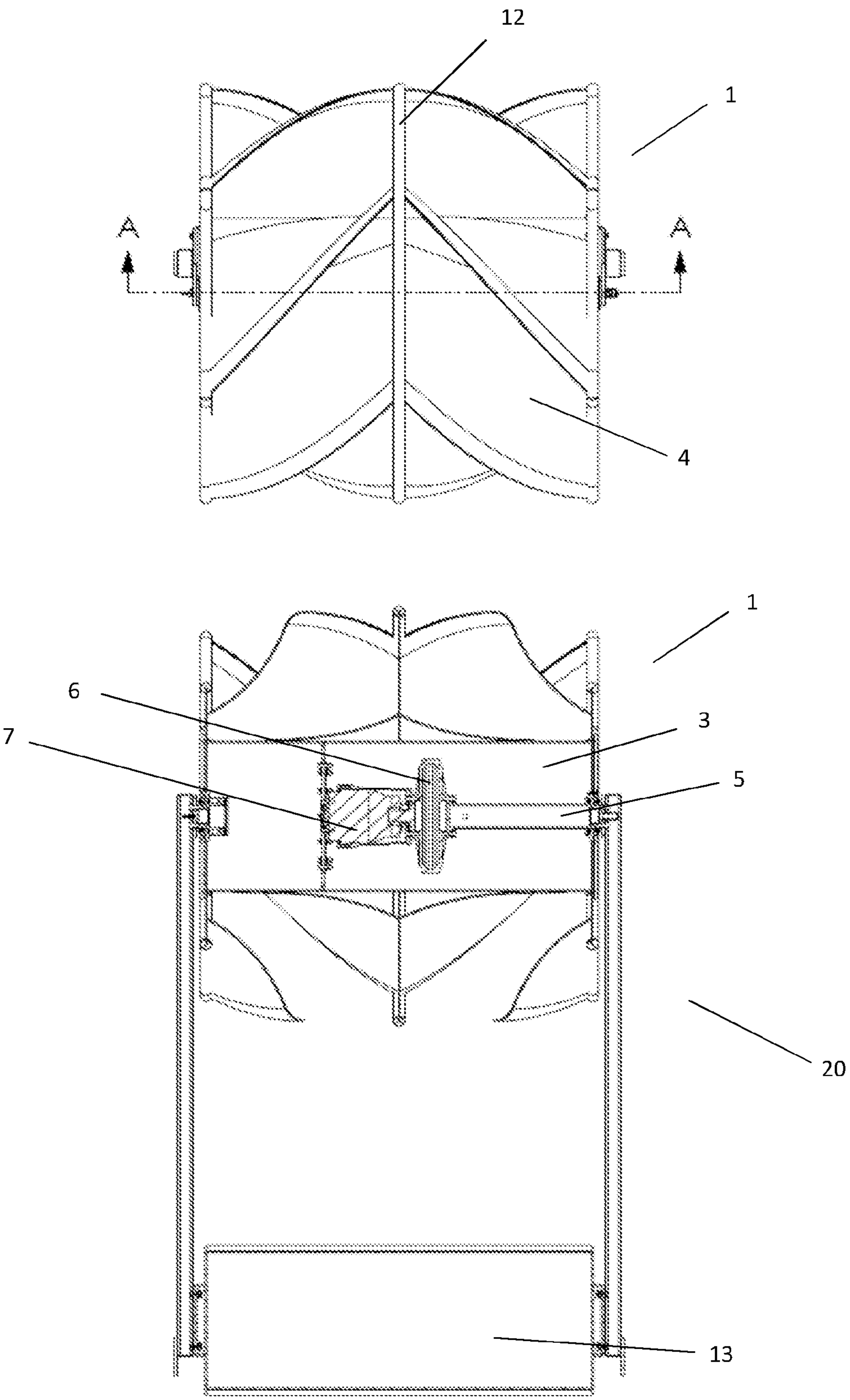
FIG. 11 shows a perspective of the inner cavity of the turbine in accordance with an embodiment of the present invention.

FIG. 11 shows how power is generated by the turbine 1. Inside the closed cavity 3 of the central cylinder 2 is provided a transmission shaft 5, a gearbox 6 and a generator 7 and electrical components that are sealed inside the closed cavity 3 so that the turbine 1 is water-tight and buoyant. The transmission shaft 5 remains stationary and the generator 6 has a rotating rotor and a fixed stator. The gearbox 6 connects the transmission shaft 5 to the generator 7. The transmission shaft 5 can be made of stainless steel. It is also envisaged that the shaft can be made of lighter materials such as carbon composite or basalt reinforced composites.

In one embodiment, the generator 7 is a coreless permanent magnet generator. When the turbine is placed in a waterway with a velocity of around 2 m/s, the transmission shaft 5 will rotate at approximately 25 rpm. Since a coreless permanent magnet generator operates at 250-350 rpm, a two-stage gearbox, such as a two-stage epicyclic gearbox, is needed to connect the transmission shaft 5 to the generator 6.

The cylinder 2 is sized so that it is large enough to create the necessary buoyancy when the turbine 1 is placed in the water. It is also sized so that it is large enough to accommodate the gearbox 6 and generator 7. The transmission shaft 5, gearbox 6 and generator 7 are sealed inside the cylinder 2 by using watertight shaft seals and bearings. This ensures that the buoyancy of the turbine 1 is maintained.

As shown in FIGS. 1, 2 and 11, the system 20 further comprises a first arm and a second arm 11, 15 and a torque reaction float 13. This is in order to stabilize the turbine 1 in the water. Each of the first arm and the second arm 11, 15 have a first end and a second end. The first end of the first arm 11 is rotatably connected to the first end face 8 of the central cylinder 2 and the first end of the second arm 15 is rotatably connected to the second end face 9 of the central cylinder 2. The torque reaction float 13 is rigidly connected to the second end of the first arm 11 and the second end of the second arm 15. The torque reaction float 13 can be shaped as a cylinder. However other configurations of the torque reaction float are also envisaged. The action of the torque reaction float 13 is sufficient to maintain the turbine 1 in the same position in the water. This allows the system 20 to be to be self-contained, with no need for additional components to stabilize the turbine 1 in the water.

The operation of the floating hydroelectric turbine system 20 will now be described with reference to FIG. 11. When the system 20 is placed in a waterway, it should be orientated parallel to the flow of water, with the turbine 1 facing the flow of water and the torque reaction float 13 trailing the turbine.

The depth of the turbine 1 in the water is dependent on the density of the turbine 1, which is dependent on the volume created by the welded components (the cylinder 2, the vanes 4, and the optional hollow disk 12), the mass of the welded components, as well as the mass of components placed in the cavity 3 of the cylinder 2. In some embodiments, the turbine 1 has a density that results in the turbine 1 being partially submerged in water. When the turbine 1 is partially submerged and stationary in the water, it will be sunk lower in the water compared to when it is rotating. This is due to the skimming effect of the flowing water on the turbine 1. In one embodiment, the turbine 1 has a density between 400 and 1000 kg/m$^3$. In another embodiment, the turbine 1 has a density such that, in use, around ¼ to ¾ of the volume of the turbine will submerge in water. In one embodiment, the turbine 1 has a density between 700 and 800 kg/m$^3$. When a turbine 1 with a density between 700 and 800 kg/m$^3$ is stationary water, the transmission shaft 5 of the turbine 1 will be submerged. When the turbine 1 rotates, however, the turbine 1 will rise so that the transmission shaft 5 is above the water level due to the skimming effect.

Figure 12:
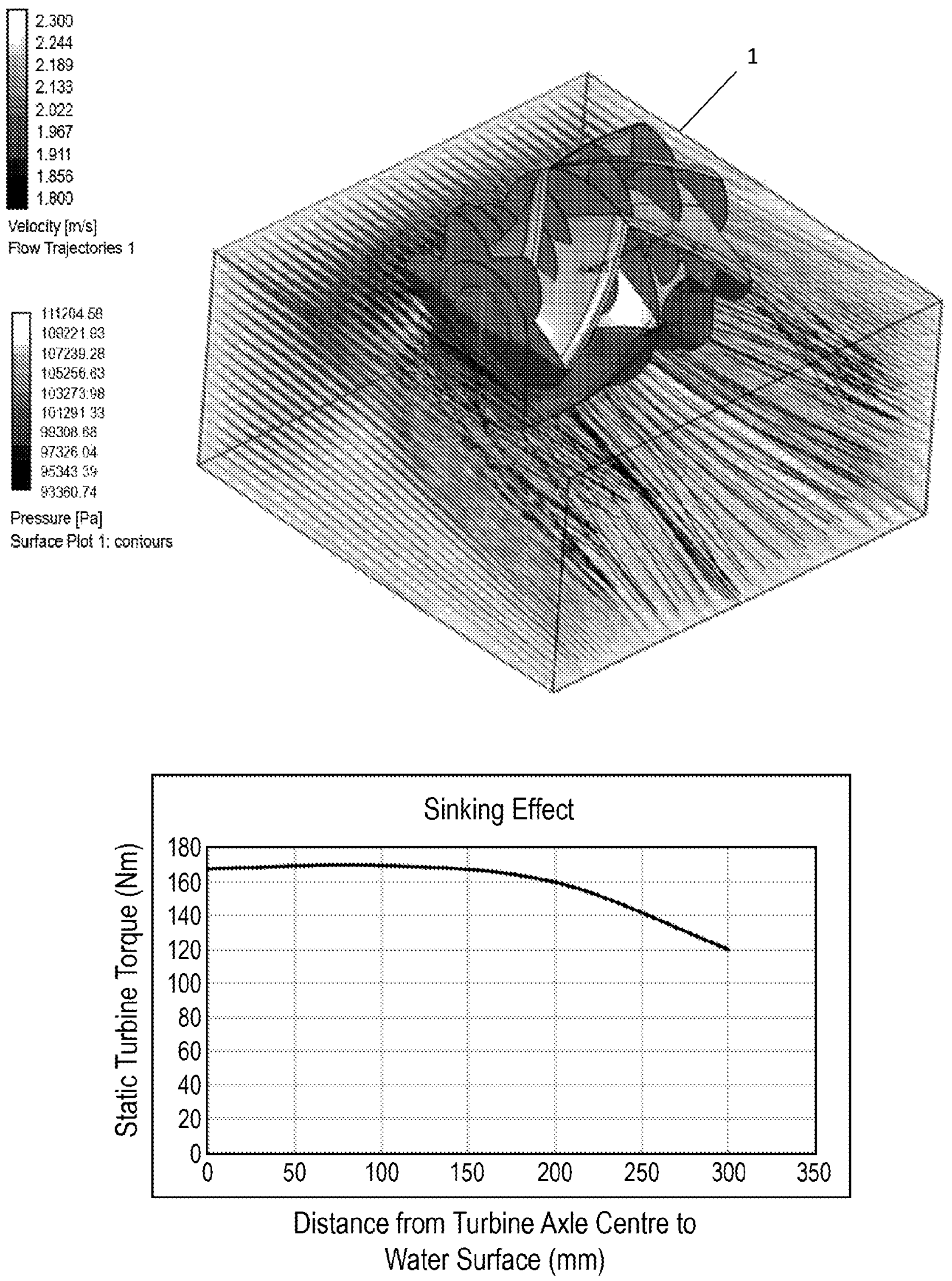
FIG. 12 shows the static turbine torque generated as a function of the degree of submersion of the turbine in the water.

As shown in FIG. 12, the resultant power output of the turbine 1 is dependent on the degree to which the turbine 1 is submerged in water. The closer the distance between the central axis of the turbine and the water surface, the greater the static turbine torque generated by the turbine 1, which correlates to power output. However, as shown in FIG. 12, it is sufficient that the transmission shaft 5 is close, and not necessarily at level with, the water surface in order for the static turbine torque to be maximized. It should also be appreciated that the turbine 1 will produce hydroelectric power regardless of the extent to which the turbine is submerged in that water, including when the turbine 1 is fully submerged underwater.

When the turbine 1 is sunk in the water so that the shaft 5 of the turbine 1 is approaching the water level, the turbine 1 creates its own impoundment and sluice effect, thereby producing greater water velocities. The torque reaction float 13 will partially submerge in the water as a reaction to the partial submergence of the turbine 1 in the water.

The rotational energy of the transmission shaft 5 will be transferred to the generator 7 by the gearbox 6. The generator 7 will then convert the rotational energy into electric energy, which can then be stored. When the turbine 1 is placed in a waterway with a velocity of 2 m/s, it is expected that the shaft of the turbine will rotate at about 25 rpm and a maximum power output of 640 W will be generated.

Once the turbine 1 is placed in a waterway, it can be tethered to stable points on the riverbanks on each side of the waterway.

A method for producing the floating hydroelectric turbine system 20 will now be described. The method comprises forming a central cylinder 2 by polymer fabrication, wherein the central cylinder 2 comprises a curved cylindrical surface 10, a first end face 8 and a second end face 9 opposite the first end face 8, wherein the first end face 8 and the second end face 9 are joined by the curved cylindrical surface 10. The central cylinder 2 has an inner cavity 3. The method further comprises forming a plurality of helical vanes 4.

The method further comprises polymer welding the plurality of helical vanes 4 to the outer side of the curved cylindrical surface 10. Channels 14 are formed between each of the plurality of helical vanes 4 which allow fish to pass along the channels 14.

Optionally, the method further comprises forming a hollow disk 12 by polymer fabrication. The hollow disk 12 has an inner radius, r, equal to the radius of the curved cylindrical surface 10, and the hollow disk 12 has an outer radius, R, equal to the radial extension of one of the plurality of helical vanes 4+r.

Optionally, the method further comprises welding the hollow disk 12 to the central cylinder at the midpoint between the first end face 8 and the second end face 9 of the central cylinder 2.

All of the aforementioned components described in the method can be formed from HDPE.

Optionally, each of the plurality of helical vanes have opposing left- and right hand augers about a line of symmetry, wherein the line of symmetry runs along the circumference of the cylinder 2 at the midpoint between the first end face 8 and the second end face 9 of the central cylinder 2. Optionally, the plurality of helical vanes 4 have a helix angle between 20 and 50 degrees. Optionally, the plurality of helical vanes 4 have a rake angle between 10 and 35 degrees. Optionally, the plurality of helical vanes 4 have rounded leading edges. Optionally, the maximum radial extension of the first end face 8 and the maximum radial extension of the second end face 9 extend beyond the radius of the curved cylindrical surface 10, wherein there are gaps 16 provided in the outer circumference of the first end face 8 and the second end face 9, wherein the gaps 16 are configured to allow, in use, to allow fish in the channels 14 to exit through the gaps 16. Optionally, the turbine 1 has between four and eight helical vanes 4. In one embodiment, the turbine has six helical vanes 4.

The method further comprises providing the shaft 5, gearbox 6, generator 7 and electrical components into the cavity 3 of the central cylinder 2. The method further comprises sealing the cavity 3.

Optionally, the turbine 1 has a density between 400 and 1000 kg/m$^3$. Optionally, the method further comprises providing a torque reaction float 13 and rotatably connecting a torque reaction float 13 to the first end face 8 and the second end face 9.

Although the present invention has been described with reference to certain embodiments, it will be understood by those skilled in the art that various changes in form and detail may be made without departing from the scope of the invention as set forth in the accompanying claims.

The invention claimed is:

1. A floating turbine system comprising a turbine comprising:

a central cylinder comprising a curved cylindrical surface, a first end face and a second end face opposite the first end face, wherein the first end face and the second end face are joined by the curved cylindrical surface, and wherein the central cylinder has a sealed inner cavity;

a plurality of helical vanes disposed on an outer side of the curved cylindrical surface;

wherein channels are formed between each of the plurality of helical vanes;

characterized in that the channels are configured to allow fish to pass along the channels, and in that a maximum radial extension of the first end face and a maximum radial extension of the second end face are greater than the radius of the curved cylindrical surface; and wherein gaps are provided in an outer circumference of the first end face and an outer circumference of the second end face, wherein the gaps are configured to allow, in use, fish in the channels to exit through the gaps.

2. The floating turbine system of claim 1, wherein each of the plurality of helical vanes have symmetrically opposing left- and right hand augers about a line of symmetry, wherein the line of symmetry runs along the circumference of the curved cylindrical surface at the midpoint between the first end face and the second end face.

3. The floating turbine system of claim 1, wherein a hollow disk is provided around the circumference of the curved cylindrical surface at the midpoint between the first end and the second end; wherein the hollow disk has an inner radius, r, equal to the radius of the curved cylindrical surface, and wherein the hollow disk has an outer radius, R, equal to a radial extension of one of the plurality of helical vanes+r.

4. The floating turbine system of claim 1, wherein each of the plurality of helical vanes have a helix angle between 20 and 50 degrees.

5. The floating turbine system of claim 1, wherein each of the plurality of helical vanes have a rake angle between 10 and 35 degrees.

6. The floating turbine system of claim 1, wherein the plurality of helical vanes have rounded leading edges.

7. The floating turbine system of claim 1, wherein the turbine has between four and eight of the helical vanes.

8. The floating turbine system of claim 1, wherein the turbine has six of the helical vanes.

9. The floating turbine system of claim 1, wherein the turbine is formed from high-density polyethylene, HDPE.

10. The floating turbine system of claim 1, wherein the turbine further comprises:

a transmission shaft, a gearbox and a generator provided within the inner cavity;

wherein the gearbox is connected to the transmission shaft;

and wherein the generator is connected to the gearbox.

11. The floating turbine system of claim 10, wherein the turbine has a density between 400 and 1000 kg/m$^3$.

12. The floating turbine system of claim 1, further comprising a torque reaction float rotatably connected to the first end face and the second end face.

13. A method for manufacturing a turbine system comprising:

forming a central cylinder by polymer fabrication, wherein the central cylinder comprises a curved cylindrical surface, a first end face and a second end face opposite the first end face, wherein the first end face and the second end face are joined by the curved cylindrical surface, and wherein the central cylinder has an inner cavity;

forming a plurality of helical vanes by polymer fabrication;

welding the plurality of helical vanes to an outer side of the curved cylindrical surface; wherein channels are formed between each of the plurality of helical vanes which allow fish to pass along the channels; characterized by:

forming a maximum radial extension of the first end face and a maximum radial extension of the second end face to be greater than the radius of the curved cylindrical surface; and forming gaps in an outer circumference of the first end face and an outer circumference of the second end face to be configured to allow, in use, fish in the channels to exit through the gaps.

14. The method of claim 13, further comprising:

providing a shaft, a gearbox, and a generator in the inner cavity of the central cylinder, wherein the gearbox is connected to the transmission shaft, and wherein the generator is connected to the gearbox; and sealing the inner cavity.

* * * * *